(12) United States Patent
Naito et al.

(10) Patent No.: US 8,867,434 B2
(45) Date of Patent: Oct. 21, 2014

(54) NETWORK TERMINAL, NETWORK SYSTEM, TIME SYNCHRONIZATION METHOD, AND TIME SYNCHRONIZATION PROGRAM

(75) Inventors: Takeshi Naito, Kyoto (JP); Shunsuke Kamijo, Tokyo (JP); Kaichi Fujimura, Tokyo (JP)

(73) Assignees: OMRON Corporation, Kyoto (JP); The University of Tokyo, Tokyo (JP)

( * ) Notice: Subject to any disclaimer, the term of this patent is extended or adjusted under 35 U.S.C. 154(b) by 482 days.

(21) Appl. No.: 13/263,393

(22) PCT Filed: Apr. 5, 2010

(86) PCT No.: PCT/JP2010/056159
§ 371 (c)(1),
(2), (4) Date: Oct. 7, 2011

(87) PCT Pub. No.: WO2010/116968
PCT Pub. Date: Oct. 14, 2010

(65) Prior Publication Data
US 2012/0027030 A1 Feb. 2, 2012

(30) Foreign Application Priority Data
Apr. 10, 2009 (JP) ................................. 2009-096203

(51) Int. Cl.
*H04B 7/212* (2006.01)
*G04G 5/00* (2013.01)
*G01V 1/22* (2006.01)
*G04G 7/00* (2006.01)
*G06F 1/14* (2006.01)

(52) U.S. Cl.
CPC .. *G04G 7/00* (2013.01); *G04G 5/00* (2013.01); *G01V 2200/12* (2013.01); *G01V 1/22* (2013.01); *G06F 1/14* (2013.01)
USPC ........... 370/324; 370/350; 370/507; 370/509; 370/512

(58) Field of Classification Search
USPC ......... 370/324, 350, 503, 507, 509, 510, 511, 370/512
See application file for complete search history.

(56) References Cited

U.S. PATENT DOCUMENTS 8,385,322 B2 * 2/2013 Colling et al. ................ 370/350
8,391,271 B2 * 3/2013 Mo et al. ....................... 370/350

OTHER PUBLICATIONS

F. Sivrikaya et al., "Time Synchronization in Sensor Networks: A Survey," IEEE Network, 2004.07, vol. 18, Issue 4, pp. 45-50, 6 pages.

(Continued)

*Primary Examiner* — Alvin Zhu
(74) *Attorney, Agent, or Firm* — Osha Liang LLP

(57) ABSTRACT

A network terminal has communication section that communicates with other network terminals connected via a network, time-series data creation section that, at timing set beforehand, creates time information including a correspondence between an identification number of the own network terminal and a current time measured by a timer of the own network terminal and creates time-series data registering the time information, and additional registration section that, when the communication section receives the time-series data transmitted from another network terminal, creates time information including a correspondence between the identification number of the own network terminal and a current time measured by the timer of the own network terminal and additionally registers the time information to the time-series data received this time.

13 Claims, 21 Drawing Sheets

(56) References Cited

OTHER PUBLICATIONS

F. Sivrikaya et al., "Time Synchronization in Sensor Networks: A Survey," IEEE Network, Jul. 2004, vol. 18, Issue 4, pp. 45-50, 6 pages.

M. Suzuki et al., "Musen Sensor Network ni Okeru Jikoku Doki Gijutsu no Kenkyu Doko," Morikawa Kenkyushitsu Gijutsu Kenkyu Hokokusho, No. 200801, Apr. 24, 2008, http://www.mlab.t.u-tokyo.ac.jp/attachmentifile/1/moritech_200801.pdf, 8 pages.

S. Ando et al., "Sensor Network Techniques," Tokyo Denki University Press, Published on May 20, 2005 (Chapter 3, Protocol of sensor networks, 3.1. Basic techniques, 3.1.1 Time synchronization, 3.1.2 RBS, pp. 95-99), 4 sheets.

International Search Report issued in PCT/JP2010/056159, mailed on Apr. 27, 2010, with translation, 2 pages.

* cited by examiner

Fig. 5A

TIME-SERIES DATA

| TRANSFER STEP NUMBER | TRAVERSED-NODE NUMBER | TIME |
|---|---|---|
| 1 | 1E | 19:00:00:026 |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

Fig. 5B

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 0 |
| 1D | 1 | 0 | 0 |
| 1E | 1 | 0 | 1 |
| 1F | 1 | 0 | 0 |
| 1G | 1 | 0 | 0 |
| 1H | 1 | 0 | 0 |

Fig. 6

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | 1D | 19:00:00:169 |
| 9 | 1F | 19:00:00:178 |
| 10 | 1C | 19:00:00:169 |
| 11 | 1B | 19:00:00:195 |
| 12 | | |
| 13 | | |
| 14 | | |

TIME-SERIES DATA

| TRANSFER STEP NUMBER | TRAVERSED-NODE NUMBER | TIME |
|---|---|---|
| 1 | 1E | 19:00:00: 026 |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 0 |
| 1D | 1 | 0 | 0 |
| 1E | 1 | 0 | 1 |
| 1F | 1 | 0 | 0 |
| 1G | 1 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00: 0 26 |
| 2 | 1H | 19:00:00: 0 11 |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 0 |
| 1D | 1 | 0 | 0 |
| 1E | 1 | 0 | 1 |
| 1F | 1 | 0 | 0 |
| 1G | 1 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:026 |
| 2 | 1H | 19:00:00:011 |
| 3 | 1B | 19:00:00:041 |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 1 |
| 1C | 1 | 0 | 0 |
| 1D | 1 | 0 | 0 |
| 1E | 1 | 0 | 1 |
| 1F | 1 | 0 | 0 |
| 1G | 1 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:026 |
| 2 | 1H | 19:00:00:011 |
| 3 | 1B | 19:00:00:041 |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 1 |
| 1C | 1 | 0 | 0 |
| 1D | 1 | 0 | 0 |
| 1E | 1 | 0 | 1 |
| 1F | 1 | 0 | 0 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 0 |
| 1D | 1 | 0 | 0 |
| 1E | 1 | 0 | 1 |
| 1F | 1 | 0 | 0 |
| 1G | 0 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 1 |
| 1D | 1 | 0 | 0 |
| 1E | 1 | 0 | 1 |
| 1F | 1 | 0 | 0 |
| 1G | 0 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | | |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 0 | 0 |
| 1B | 1 | 0 | 0 |
| 1C | 1 | 0 | 1 |
| 1D | 1 | 0 | 0 |
| 1E | 1 | 0 | 1 |
| 1F | 1 | 0 | 1 |
| 1G | 0 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | | |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 0 |
| 1C | 1 | 0 | 1 |
| 1D | 1 | 0 | 0 |
| 1E | 1 | 0 | 1 |
| 1F | 1 | 0 | 1 |
| 1G | 0 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | | |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 1 |
| 1D | 1 | 0 | 0 |
| 1E | 1 | 0 | 1 |
| 1F | 1 | 0 | 1 |
| 1G | 0 | 0 | 0 |
| 1H | 1 | 0 | 0 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | | |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 1 |
| 1D | 1 | 0 | 0 |
| 1E | 1 | 0 | 1 |
| 1F | 1 | 0 | 1 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | | |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 1 |
| 1D | 1 | 0 | 0 |
| 1E | 1 | 0 | 2 |
| 1F | 1 | 0 | 1 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | 1D | 19:00:00:169 |
| 9 | | |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 1 |
| 1D | 1 | 0 | 1 |
| 1E | 1 | 0 | 2 |
| 1F | 1 | 0 | 1 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | 1D | 19:00:00:169 |
| 9 | 1F | 19:00:00:178 |
| 10 | | |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 1 |
| 1D | 1 | 0 | 1 |
| 1E | 1 | 0 | 2 |
| 1F | 1 | 0 | 2 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | 1D | 19:00:00:169 |
| 9 | 1F | 19:00:00:178 |
| 10 | 1C | 19:00:00:169 |
| 11 | | |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 2 |
| 1D | 1 | 0 | 1 |
| 1E | 1 | 0 | 2 |
| 1F | 1 | 0 | 2 |
| 1G | 0 | 0 | 0 |
| 1H | 1 | 0 | 1 |

TIME-SERIES DATA

| TRANSFER STEP NUMBER | TRAVERSED-NODE NUMBER | TIME |
|---|---|---|
| 1 | 1E | 19:00:00:096 |
| 2 | 1C | 19:00:00:081 |
| 3 | 1F | 19:00:00:111 |
| 4 | 1A | 19:00:00:118 |
| 5 | 1B | 19:00:00:124 |
| 6 | 1H | 19:00:00:116 |
| 7 | 1E | 19:00:00:158 |
| 8 | 1D | 19:00:00:169 |
| 9 | 1F | 19:00:00:178 |
| 10 | 1C | 19:00:00:169 |
| 11 | 1B | 19:00:00:195 |
| 12 | | |
| 13 | | |
| 14 | | |

NODE-STATUS TABLE

| NODE NUMBER | COMMUNICABILITY-INDICATING FLAG | TIME-SETTING COMPLETION FLAG | TRAVERSED NUMBER OF TIMES |
|---|---|---|---|
| 1A | 1 | 1 | 1 |
| 1B | 1 | 0 | 1 |
| 1C | 1 | 0 | 2 |
| 1D | 1 | 0 | 1 |
| 1E | 1 | 0 | 2 |
| 1F | 1 | 0 | 2 |
| 1G | 0 | 0 | 0 |
| 1H | 1 | 0 | 1 |

NETWORK TERMINAL, NETWORK SYSTEM, TIME SYNCHRONIZATION METHOD, AND TIME SYNCHRONIZATION PROGRAM

BACKGROUND

1. Technical Field

The present invention relates to network terminals connected communicable with other network terminals via a network, network systems connecting a plurality of network terminals in a communicable manner via a network and time synchronization methods and time synchronization programs for synchronizing network terminals making up such a network system.

2. Background Art

Conventionally sensor network systems enabling mutual communication of a plurality of sensor nodes via a network have been used for the purposes such as hydrographic observation and seismic observation. A sensor node is disposed at each observation point. The sensor nodes are terminals equipped with a sensor function for measurement of phenomena to be observed and a communication function for communication with other sensor nodes. Then, measurement data by each sensor node is collected and processed for observation of a target.

Such a sensor network system is required to synthesize the sensor nodes for temporal matching of measurement data on phenomena to be observed between the sensor nodes. Available techniques for time synchronization to synchronize the sensor nodes includes RBS (Reference Broadcast Synchronization) described in Non-Patent Document 1, for example. RBS is a technique using a time synchronization server that broadcast-transmits a packet called a "reference packet" at regular intervals to allow clients (sensor nodes) to set their timers on the basis of information of the reference packet received, thus synchronizing the sensor nodes.

[Non-Patent Document 1] "Sensor Network Techniques" written and edited by Shigeru Ando, Yosuke Tamura, Yoshito Tobe, and Masaki Minami, Tokyo Denki University Press, Published on May 20, 2005 (Chapter 3, Protocol of sensor networks, 3.1. Basic techniques, 3.1.1 Time synchronization, 3.1.2 RBS, pp 95 to 99)

SUMMARY

According to the RBS, however, a time synchronization server is required to broadcast-transmit a "reference packet" at regular intervals, resulting in expansion of system scale.

Further, time synchronization by RBS cannot be used for a sensor network system of an ad-hoc type made up of sensor nodes directly connected.

One or more embodiments of the present invention provides a network terminal, a time synchronization method and a time synchronization program, by which system scale can be suppressed, and measured times can be synchronized with other network terminals even with an ad-hoc type system.

One or more embodiments of the present invention provides a network system using such a network terminal.

A network terminal according to one or more embodiments of the present invention is configured as follows.

The network terminal includes communication means that communicates with other network terminals connected via a network. At timing set beforehand, time-series data creation means creates time information including a correspondence between an identification number of the own network terminal and a current time measured by a timer of the own network terminal and creates time-series data registering this time information. The timing for creating this time-series data may be 12 A.M. everyday, every hour on the hour or the like. When the communication means receives the time-series data transmitted from another network terminal, additional registration means creates time information including a correspondence between the identification number of the own network terminal and a current time measured by the timer of the own network terminal and additionally registers the time information to the time-series data received this time. Transfer destination decision means decides a network terminal as a transfer destination for each of time-series data created by the time-series data creation means and time-series data to which time information is additionally registered by the additional registration means. Transfer means transfers the time-series data to the transfer destination decide by the transfer destination decision means.

Therefore, every time the time-series data is transferred to a network terminal as a transfer destination, time information is additionally registered thereto at the network terminal.

Determination means determines whether time-series data to which the time information is additionally registered by the additional registration means satisfies or not a time-setting condition. The determination means determines whether the time-setting condition is satisfied or not on the basis of whether the number of network terminals registering the time information a plurality of times exceeding or not a threshold number of network terminals set beforehand. Then, when the determination means determines that the time-setting condition is satisfied, time-setting means corrects a time measured by the timer of the own network terminal on the basis of time information registered in the time-series data.

In this way, the time-setting means corrects a time measured by the timer of the own network terminal on the basis of time information of other network terminals existing on the network. That is, each network terminal corrects the time measured by the timer of the own terminal on the basis of time information of other network terminals existing on the network. As a result, timers of the network terminals can be synchronized in their measured time.

For instance, as for a network terminal registering time information a plurality of times, an average transferring processing time required for transferring of the time-series data between any two network terminals can be calculated on a basis of time duration between time information firstly registered by this network terminal and time information last registered by this network terminal and a number of times of transferring between the time duration. As the number of network terminals registering time information a plurality of times is increased, the accuracy of the average transferring processing time calculated also is improved. On the other hand, as the number of network terminals registering time information a plurality of times is increased, time required until the time-setting condition is satisfied after the creation of time-series data is longer. Therefore, according to one or more embodiments of the present invention, the time-setting condition is set with consideration given to the accuracy of synchronization in measured time by timers of the network terminals, a time allowed for the synchronization processing and the like.

Further, origin point time, a time measured by the timer at certain timing, can be calculated using the calculated average transferring processing time for each of network terminals registering the time information a plurality of times, and an average of these measured times can be calculated as an average origin point time. Such an average origin point time can be regarded as an average of times measured by timers of a plurality of network terminals existing on the network at certain timing.

The calculation accuracy of the average origin point time is affected by the calculation accuracy of the aforementioned average transferring processing time.

Then, the time-setting means calculates a correction time to correct a time measured by the timer of the own network terminal on a basis of the calculated average transferring processing time and average origin point time. This correction time may be a difference between the origin point time of the own terminal and the average origin point time. The origin point time of the own terminal can be calculated using the aforementioned average transferring processing time.

The time-setting condition may be that the number of network terminals registering the time information a plurality of times and performing transferring during duration between the time information firstly registered and the time information last registered exceeding a transferring threshold number of times set beforehand exceeds a threshold number of network terminals set beforehand in the time-series data. Such a condition can improve the calculation accuracy of the average transferring processing time.

The transfer destination decision means may set, as a transmission destination, a network terminal having a minimum number of registrations of time information in the time-series data to be transferred this time among the network terminals connected via the network, and when the network terminal set as the transmission destination is not communicable directly, the transfer destination decision means decides, as a transfer destination, another network terminal that is located on a communication path with the network terminal and is directly communicable. With this configuration, time-series information can be transferred to the network terminals uniformly. As a result, a time until the time-series information satisfies the time-setting condition can be suppressed.

In this case, when a transmission destination set in the time-series data transmitted from another network terminal received by the communication means is other than the own network terminal, a transmission destination is not set for the time-series data, i.e., the transmission destination is not changed.

According to one or more embodiments of the present invention, scale of a network system can be suppressed. Further, such a network system, even as an ad-hoc type system, enables synchronization with other sensor nodes in measured time.

BRIEF DESCRIPTION OF THE DRAWINGS

FIG. 5A and FIG. 5B illustrate time-series data and a node-status table, respectively.

FIG. 6 illustrates time-series data.

FIG. 16A to FIG. 16C describe time synchronization processing.

DETAILED DESCRIPTION

The following describes embodiments of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
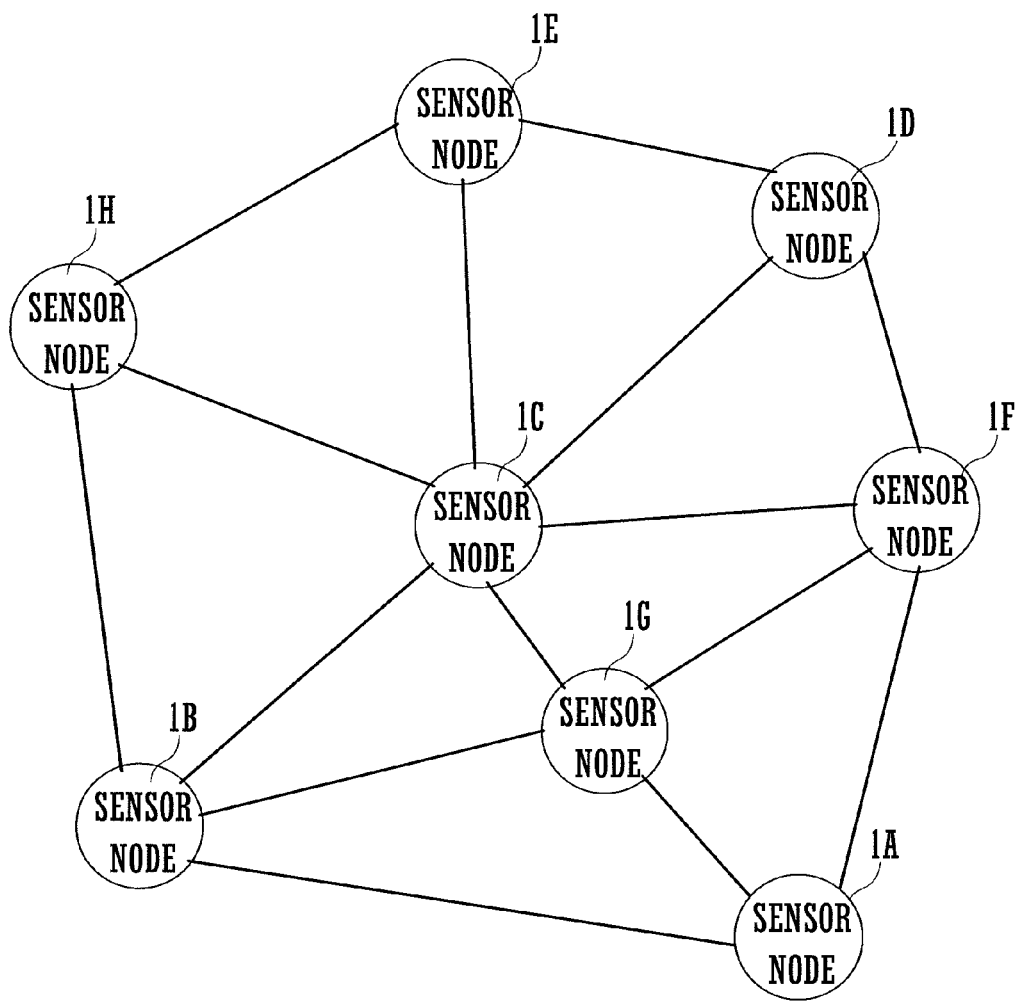
FIG. 1 illustrates a sensor network system.

FIG. 1 illustrates a sensor network system. This sensor network system connects a plurality of sensor nodes 1 (1A to 1H) in a communicable manner via a network. In FIG. 1, lines connecting the sensor nodes 1 indicate links. These sensor nodes 1 correspond to network terminals referred to in one or more embodiments of the present invention. Communication between the sensor nodes 1 is performed directly or via another sensor node 1. In this specification, a directly communicable sensor node 1 may be called an adjacent sensor node 1, and a sensor node 1 not communicable directly (sensor node 1 communicating via another sensor node 1) may be called a not-adjacent sensor node 1. Communication between the sensor nodes 1 may be performed by wireless or wired.

This sensor network system can be used as an observation system for hydrographic observation, seismic observation and the like. A sensor node 1 is disposed at each observation point.

Figure 2:
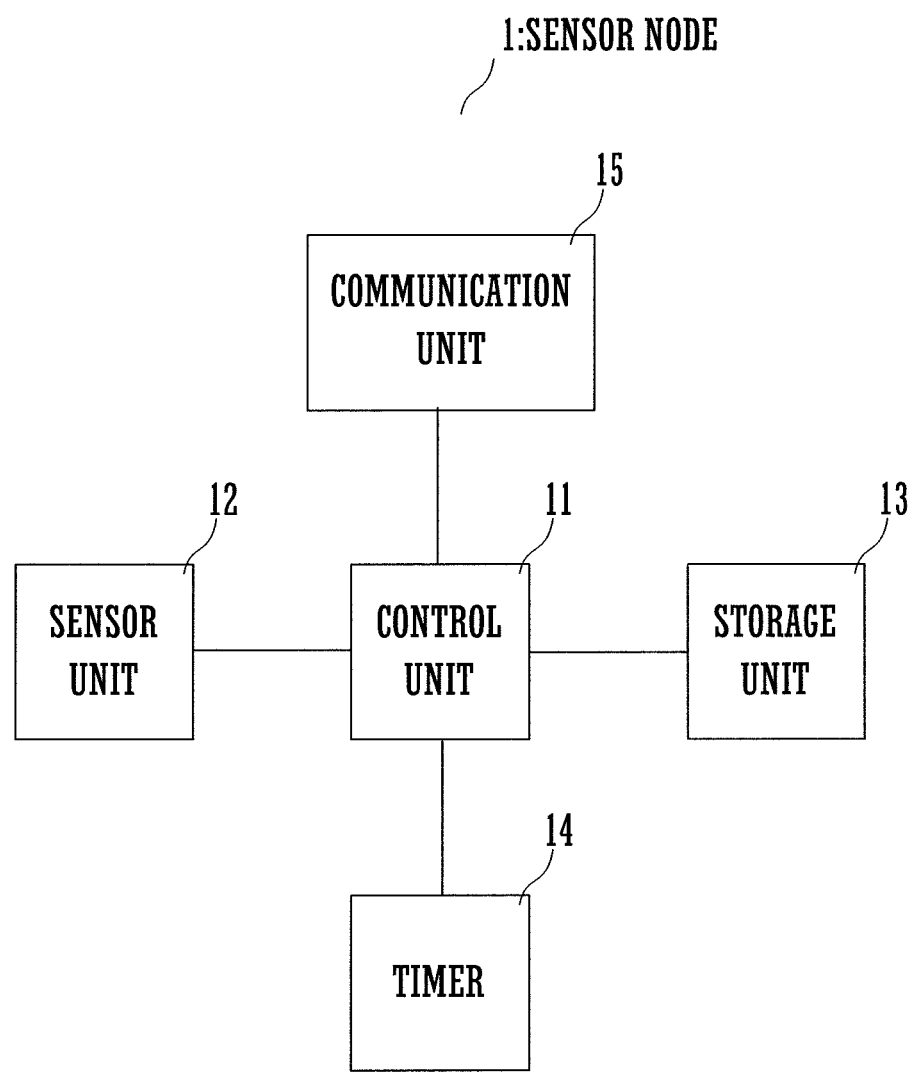
FIG. 2 illustrates the configuration of a major part of a sensor node.

FIG. 2 illustrates the configuration of a major part of a sensor node. The sensor node 1 includes a control unit 11, a sensor unit 12, a storage unit 13, a timer 14 and a communication unit 15. The control unit 11 controls operations of various units of a main body. The sensor unit 12 measures a phenomenon to be observed and processes a measurement result. The sensor unit 12 includes an optical sensor, an acceleration sensor, an image sensor or the like corresponding to the phenomenon to be observed, and measures the phenomenon to be observed with such a sensor. The sensor unit 12 further is equipped with a processing function to process an output from the sensor. The storage unit 13 stores an operation program to make the device main body operate, configuration data used for the operation and the like. This configuration data, for example, contains network topology of the sensor network system, synchronization processing starting timing described later as well as a time-setting condition. The storage unit 13 further has a working area to temporarily store processing data generated during the operation and the like. The timer 14 measures a current time. The communication unit 15 communicates with another sensor node 1 existing on a network.

The following describes the time synchronization processing in the sensor node 1.

Figure 3:
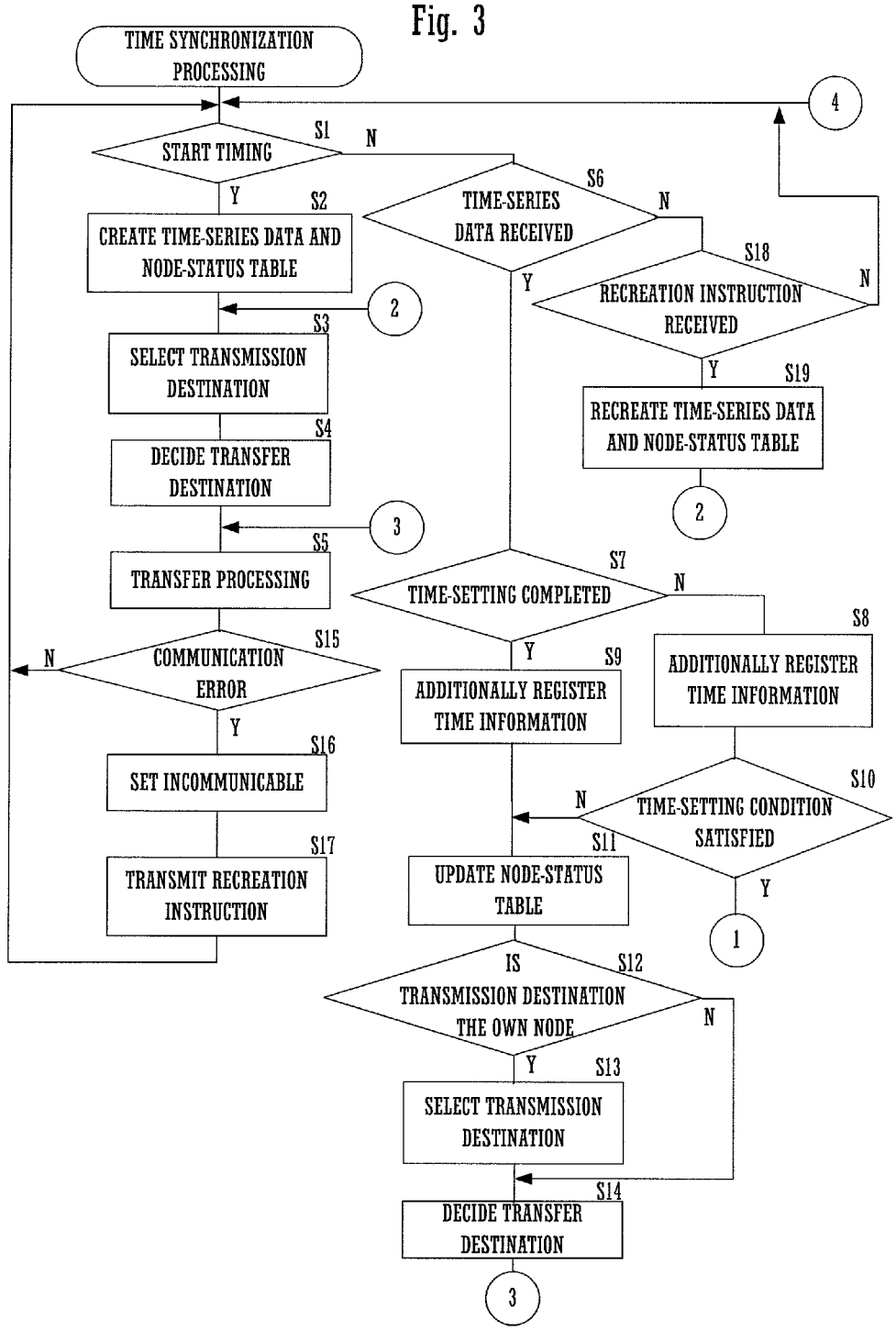
FIG. 3 is a flowchart illustrating time synchronization processing.
Figure 4:
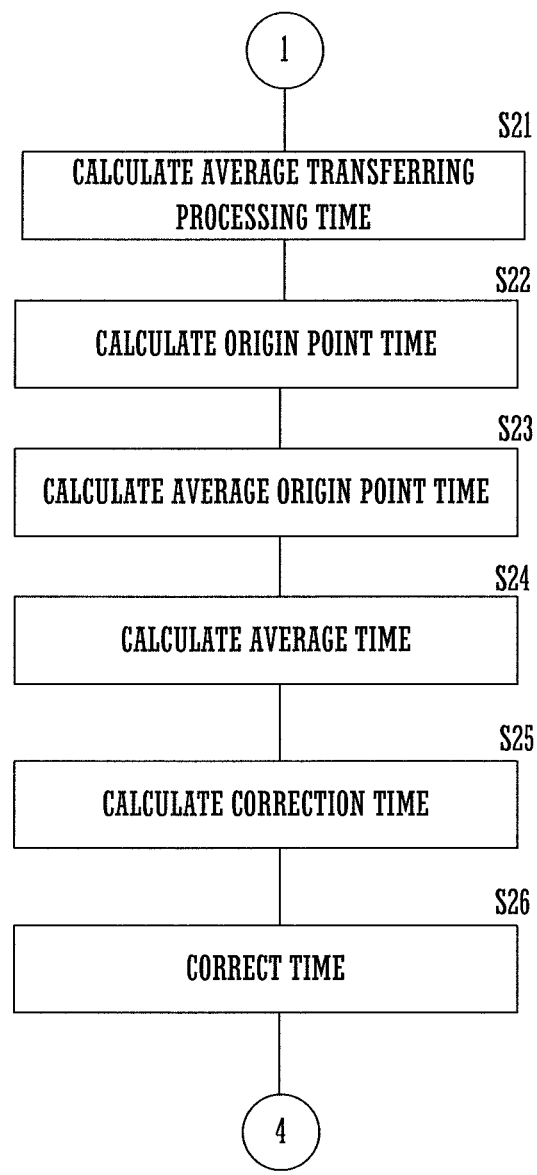
FIG. 4 is a flowchart illustrating time synchronization processing.

Each sensor node 1 has a starting timing of the time synchronization processing set therein. This starting timing of the time synchronization processing may be 12 A.M. everyday, every hour on the hour or the like. FIG. 3 and FIG. 4 are flowcharts illustrating the time synchronization processing. Each sensor node 1 existing on the network illustrated in FIG. 1 executes this time synchronization processing.

When the time measured by the timer 14 of the sensor node 1 reaches the set starting timing of the time synchronization processing (S1), the sensor node 1 creates time-series data and a node-status table (S2). As illustrated in FIG. 5A, the time-series data accumulatively registers time information including a correspondence among a transfer step number, a traversed-node number and a time. The transfer step number is a serial number. The traversed-node number is a number (in this example, 1A to 1H) to identify a sensor node 1 registering this time information. The time is a time measured by the timer 14 when this time information is registered. The time-series data created at S2 registers only time information by the sensor node creating this time-series data. FIG. 5A exemplifies time-series data created by a sensor node 1E.

As illustrated in FIG. 5B, the node-status table is a table registering node information containing a correspondence among a node number, a communicability-indicating flag, a time-setting completion flag and a traversed number of times for each node. The node number is a number (in this example, 1A to 1H) to identify the sensor node 1. The communicability-indicating flag is a flag indicating the communicability state of the corresponding sensor node 1. The time-setting completion flag is a flag indicating whether time-setting is completed or not for the corresponding sensor node 1 with the time synchronization processing this time. The traversed number of times indicates the number of times of time-series data as a pair traversing the corresponding sensor node 1. In the node-status table created at S2, the communicability-indicating flag of each sensor node 1 is set at "1" (communicable) and the time-setting completion flag is set at "0" (time is not yet set). The traversed number of times is set at "1" for the sensor node 1 creating this node-status table, and is set at "0" for other sensor nodes.

During the time synchronization processing, the time-series data and the node-status table created at S2 are made a pair, and such a pair is repeatedly transferred among the sensor nodes 1 existing on the network.

The sensor node 1 selects a sensor node 1 that is to be set as a transmission destination of the time-series data and the node-status table created at S2 (S3). Further, the sensor node 1 selects a sensor node 1 that is to be set as a transfer destination of the time-series data and the node-status table in accordance with the sensor node 1 selected as the transmission destination at S3 (S4). At S3, the sensor node 1 selects the transmission destination at random from among other sensor nodes 1 registered in the node-status table. At S4, determination is made as to whether the transmission destination selected this time is a directly-communicable (adjacent) sensor node 1 or not, and if the sensor node is a directly-communicable sensor node 1, such a sensor node 1 selected as the transmission destination is decided as the transfer destination. On the other hand, if the sensor node is a directly-incommunicable (not-adjacent) sensor node 1, another sensor node 1 having the shortest communication path with the sensor node 1 selected as the transmission destination (a path minimizing the number of sensor nodes 1 traversed) and that is directly communicable is decided as the transfer destination. The sensor node 1 decides such a transfer destination using the network topology stored in the storage unit 13.

The sensor node 1 makes the communication unit 15 transmit a pair of the time-series data and the node-status table to the transfer destination (S5). At S5, the time-series data and the node-status table to be transmitted are associated with information indicating the transmission destination selected this time and the transfer destination decided this time. Round information is further associated therewith, the round information indicating what round (round depends on a starting timing) the time synchronization processing this time relates to. The round information may be information indicating the starting date and time of the time synchronization processing this time, for example.

When receiving time-series data and node-status table transferred from another sensor node 1 with the communication unit 15 (S6), the sensor node 1 determines whether the time-setting is already completed or not with this time synchronization processing (S7). The storage unit 13 of the sensor node 1 stores a flag indicating whether the time-setting of the timer 14 is completed or not with this time synchronization processing. If the time-setting is not completed, the sensor node 1 creates time information and additionally registers the time information to the time-series data received this time (S8). The time information additionally registered at S8 is created at this timing. More specifically, the transfer step number registered is a number obtained by incrementing the number registered at the reception timing by one. The traversed-node number registered is a number to identify the own sensor node 1. The time registered is measured by the timer 14 at this time.

Even when the time-setting is completed, the sensor node 1 creates time information and additionally registers the time information to the time-series data received this time (S9). Although S8 and S9 are substantially the same processing, they have different times for created time information. At S8, the time of the time information created is set at the time measured by the timer 14 at that time. On the other hand, at S9, the time of the time information created is set a time obtained by bringing the time measured by the timer 14 at that time back by a correction time corrected by time-setting processing described later. That is, the time of the time information created is a time before the time-setting.

When the time-setting processing is performed, the sensor node 1 stores a correction time this time in the storage unit 13. The details of this processing are described later.

The sensor node 1 determines whether the time-series data including the time information additionally registered at S8 satisfies a time-setting condition set beforehand or not (S10). This time-setting condition enables determination as to whether the time-series data is suitable for the time-setting of the timer 14 or not. The details of the condition are described later.

If the sensor node 1 determines at S10 that the time-series data does not satisfy the time-setting condition and if time information is additionally registered at S9, the sensor node 1 updates the node-status table by incrementing the traversed number of times of the own sensor node 1 by 1 (S11). If the time-setting is already completed with the time synchronization processing this time, the sensor node 1 sets the time-setting completion flag of the own sensor node 1 at "1".

The sensor node 1 determines whether the transmission destination associated with the time-series data and the node-status table received this time is the own sensor node 1 or another sensor node 1 (S12). If the sensor node 1 determines that the transmission destination is the own sensor node 1, the sensor node 1 selects a sensor node 1 to be set as a transmission destination of the time-series data and the node-status table updated this time (S13). At S13, the sensor node 1 selects the transmission destination at random from among other sensor nodes without the communicability-indicating flag set at "0" (incommunicable) and with the minimum traversed number of times. A sensor node 1 with the communicability-indicating flag set at "0" is in an incommunicable state because of a certain reason. The processing setting this communicability-indicating flag at "0" is described later. At S13, sensor nodes 1 in an incommunicable state are not selected as a transmission destination.

If the sensor node 1 determines at S12 that the transmission destination is not the own sensor node 1, the sensor node 1 does not perform processing at S13. That is, the transmission destination is not changed. The sensor node 1 decides a sensor node 1 as a transfer destination in accordance with the transmission destination selected at this time (S14), and transmits a pair of the time-series data and the node-status table to the transfer destination at S5. In this case also, the time-series data and the node-status table to be transmitted are associated with information indicating the transmission destination selected and the transfer destination decided this time.

When the sensor node 1 successively transfers the time-series data and the node-status table at S5 (S15), the sensor node 1 returns to S1. On the other hand, when failing in the transferring of the time-series data the node-status table at S5, the sensor node 1 resets the communicability-indicating flag of the node-status table of the sensor node 1 set as the transfer destination this time (set it at "0") (S16). That is, the sensor node 1 sets it as incommunicable. The sensor node 1 makes a notification to the sensor node 1 creating the time-series data that cannot be transferred successfully, the notification instructing to recreate time-series data (S17), and returns to S1. At S17, the sensor node 1 makes a notification of the node-status table updated at S16 as well and makes a notification of an incommunicable sensor node 1 that is known at this time. The sensor node 1 creating this time-series data can be identified on the basis of the time information registered at the beginning of such time-series data.

When receiving the instruction to recreate time-series data, the sensor node 1 recreates time-series data and a node-status table (S18, S19) and performs processing of S3 or later. Although S19 is the same as the processing at S2, the sensor node 1 creates a node-status table with a communicability-indicating flag set at "0" for the incommunicable sensor node 1 that is known at this time.

In this way, the time-series data and the node-status table are repeatedly transferred among the sensor nodes 1, and every time they are transferred, time information is additionally registered to the time-series data.

The following describes a decision as to whether the time-setting condition at S10 is satisfied or not. At S10, if, in the time-series data, the number of sensor nodes 1 registering time information a plurality of times and performing transferring during duration between the first registered time information and the last registered time information exceeding a transferring threshold number of times set beforehand exceeds a threshold number of sensor nodes set beforehand, it is determined that this time-series data satisfies the time-setting condition.

This time-setting condition may be set in a condition such that the following average transferring processing time and average origin point time can be calculated with a certain degree of accuracy. The average transferring processing time is an average time required for transferring of time-series data and a node-status table between adjacent sensor nodes 1 existing on the network. The average origin point time is an average time of times measured by timers of the sensor nodes 1 existing on the network at certain timing.

Accordingly, as the transferring threshold number of times and the threshold number of sensor nodes are increased, the accuracy of the average transferring processing time calculated and the accuracy of the average origin point time calculated using this average transferring processing time are improved. Further, since each sensor node 1 sets its timer 14 to this average origin point time, as the calculation accuracy of the average origin point time is improved, the time synchronization accuracy between sensor nodes 1 also is improved. On the other hand, as the transferring threshold number of times and the threshold number of sensor nodes are increased, the transferring number of times until the time-series data satisfies the time-setting condition is increased. That is, processing time for this time synchronization processing is increased. Therefore, the transferring threshold number of times and the threshold number of sensor nodes may be set in accordance with accuracy of time synchronization required for the system. According to one or more embodiments of the present invention, transferring threshold number of times and the threshold number of sensor nodes are set with consideration given to the number of all sensor nodes 1 existing on the network as well.

The following describes the case where, in the sensor network system illustrated in FIG. 1, the transferring threshold number of times is set at 2 and the threshold number of sensor nodes is set at 3. That is, if the number of sensor nodes 1 each registering time information a plurality of times and registering three pieces or more of time information between the time information firstly registered by the sensor node 1 and the time information last registered is four or more, then the sensor node 1 determines that the time-setting condition is satisfied.

When the sensor node 1 determines at S10 that the time-setting condition is satisfied (S21), the sensor node 1 calculates the average transferring processing time. At S21, the sensor node 1 finds a difference between the time of the last time information and the time of the first time information (i.e., elapsed time from the registration of the first time information to the registration of the last time information) for each of the sensor nodes 1 registering time information exceeding the transferring threshold number of times and calculates a total time of them. Further, the sensor node 1 finds a difference between the step number of the last time information and the step number of the first time information (i.e., the number of times of transferring of time-series data from the registration of the first time information to the registration of the last time information) for each of the sensor nodes 1 registering time information exceeding the transferring threshold number of times and calculates a total number of times of them. Then, the sensor node 1 divides the thus calculated total time by the thus calculated total number of times to calculate an average transferring processing time.

For instance, when the time-series data illustrated in FIG. 6 is received and it is determined that the time-setting condition is satisfied at S10, the total time obtained by summing the elapsed times from the registration of the first time information to the registration of the last time information for the sensor nodes 1B, 1C, 1E and 1F registering time information exceeding the transferring threshold number of times will be as follows:

(195−124)+(169−81)+(158−96)+(178−111)=288 [ms].

The total number of times obtained by summing the numbers of times of transferring of time-series data from the registration of the first time information to the registration of the last time information for these sensor nodes 1B, 1C, 1E and 1F will be as follows:

(11−5)+(10−2)+(7−1)+(9−3)=26[step].

Accordingly, the average transferring processing time will be calculated as follows:

288/26=11.08[ms/step].

Next, the sensor node 1 calculates the time measured by the timer 14 at timing when the transfer step number set virtually is "0" (hereinafter called an origin point time) for each of the sensor nodes 1B, 1C, 1E and 1F used for the calculation of the average transferring processing time this time (S22). This origin point time is calculated using the average transferring processing time calculated at S21. More specifically, the time obtained as the product of the average transferring processing time and the number of steps is subtracted from the time of the last registered time information for each of the sensor nodes 1.

For instance, in the example illustrated in FIG. 6, the origin point time of each of the sensor nodes 1B, 1C, 1E and 1F will be as follows:

Sensor node 1B:19:00:00:195−11.08×11=19:00:00: 073.12

Sensor node 1C:19:00:00:169−11.08×10=19:00:00: 058.20

Sensor node 1E:19:00:00:158−11.08×7=19:00:00: 075.40

Sensor node 1F:19:00:00:195−11.08×9=19:00:00: 078.28.

Then, the sensor node 1 calculates an average origin point time (S23). At S23, an average of the origin point times of the sensor nodes 1B, 1C, 1E and 1F calculated at S22 is calculated as the average origin point time. In the example of FIG. 6, the average origin point time will be 19:00:00:071.25.

Further, the sensor node 1 uses the average transferring processing time calculated at S21 and the average origin point time calculated at S23 to calculate an average time at timing when the last time information is registered (S24). The sensor node 1 registering the last time information is the own sensor node 1. The sensor node 1 calculates a difference between the average time calculated at S24 and the time of the last registered time information as a correction time for the timer 14 of the own sensor node 1 (S25). In the example illustrated in FIG. 6, the correction time is 1.87[ms].

Note here that in the example illustrated in FIG. 6, since the last time information registered by the own sensor node 1 is used for the processing at S21 or later, the calculation of a correction time for the timer 14 of the own sensor node 1 using a difference between the origin point time of the own sensor node 1 calculated at S23 and the average origin point time calculated at S24 will be the same result. On the other hand, when it is determined that the time-setting of the own sensor node 1 is completed at the aforementioned S7 and the time-series data at this time satisfies the time-setting condition, the last time information registered by a next sensor node 1 to which the time-series data is transferred is used at the processing of S21 or later. For this reason, even when the origin point time is not calculated for the next sensor node 1, the correction time can be calculated at the processing of the aforementioned S24 and S25.

The sensor node 1 corrects the time of the timer 14 with the correction time calculated at S25 (S26). Further the sensor node 1 stores this correction time in the storage unit 13. The sensor node 1 uses the stored correction time to perform processing at S9.

After correcting the time of the timer 14 at S26, the sensor node 1 returns to S1 without transferring the time-series data used for the processing this time to another sensor node 1. Thus, the time-series data created by any sensor node 1 disappears from the sensor network when any sensor node 1 uses the time-series data for the time correction of its timer 14. Normally since the number of the sensor nodes 1 creating time-series data and the number of the sensor nodes 1 performing time-setting are the same, all time-series data will disappear from the network when all of the sensor nodes 1 completes the time-setting. At this time, the time synchronization processing is completed.

However, after the time-series data is created, a sensor node 1 may become incommunicable. Therefore, according to one or more embodiments of the present invention, when it is determined that either one of the completion of the time-setting and an incommunicable state is set for all of the sensor nodes 1 in the node-status table, each sensor node 1 is configured to prohibit (not transfer) the transferring of such time-series data. This processing may be performed prior to S11. Thereby, according to one or more embodiments of the present invention, even when a sensor node 1 becomes incommunicable after creation of time-series data, a problem of continuously transferring of the time-series data over the sensor network can be prevented.

The following describes the operation of the above-stated flowchart illustrated in FIG. 3 and FIG. 4 by way of a specific example. FIG. 7 to FIG. 21 illustrate a specific example of the time synchronization processing. In FIG. 7 to FIG. 21, A illustrates the transferring of time-series data on a sensor network, B illustrates time-series data and C illustrates a node-status table.

Figures 7A, 7B, 7C:
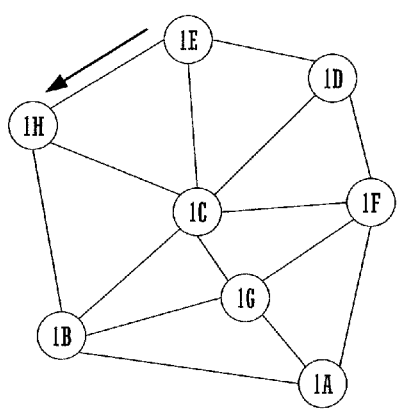
FIG. 7A to FIG. 7C describe time synchronization processing.

Similarly to FIG. 5, FIG. 7 illustrates an example of the sensor node 1E creating time-series data of FIG. 7B and a node-status table of FIG. 7C. At S3, the sensor node 1E selects a sensor node 1H having a traversed number of times of 0 as a transmission destination of the time-series data and the node-status table. Since the sensor node 1H is adjacent to the sensor node 1E, the sensor node 1E decides the sensor node 1H as a transfer destination at S4 and transmits the time-series data and the node-status table.

Figures 8A, 8B, 8C:
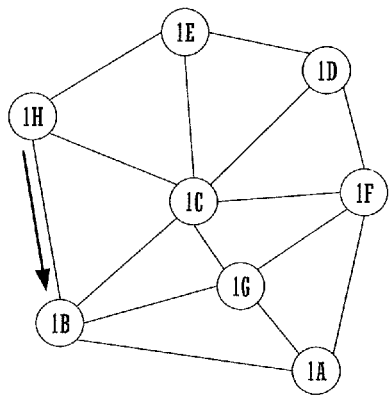
FIG. 8A to FIG. 8C describe time synchronization processing.

When receiving the time-series data and the node-status table, the sensor node 1H additionally registers time information to the time-series data at S8 (see FIG. 8B). At S11, the sensor node 1H updates the node-status table (see FIG. 8C). At S11, the sensor node 1H increments the traversed number of times corresponding to the own sensor node 1H by one. At S13, the sensor node 1H selects a sensor node 1B as a new transmission destination having a traversed number of times of 0 because the own sensor node 1H is set as the transmission destination. Since the sensor node 1B is adjacent to the sensor node 1H, the sensor node 1H decides the sensor node 1B as a transfer destination at S14 and transmits the time-series data and the node-status table.

Figures 9A, 9B, 9C:
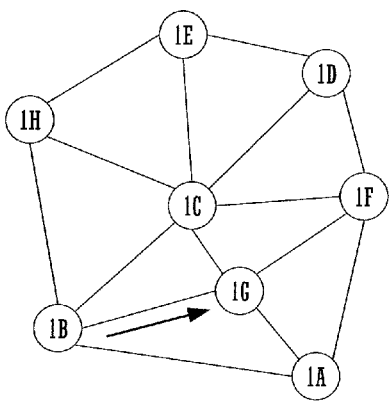
FIG. 9A to FIG. 9C describe time synchronization processing.
Figures 10A, 10B, 10C:
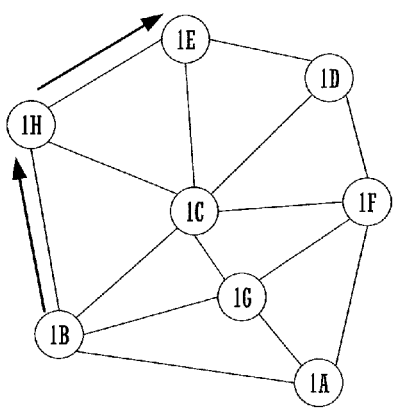
FIG. 10A to FIG. 10C describe time synchronization processing.

When receiving the time-series data and the node-status table, the sensor node 1B additionally registers time information to the time-series data at S8 (see FIG. 9B). At S11, the sensor node 1B updates the node-status table (see FIG. 9C). At S11, the sensor node 1B increments the traversed number of times corresponding to the own sensor node 1B by one. At S13, the sensor node 1B selects a sensor node 1G having a traversed number of times of 0 as a new transmission destination because the own sensor node 1B is set as the transmission destination. Since the sensor node 1G is adjacent to the sensor node 1B, the sensor node 1B decides the sensor node 1G as a transfer destination at S14 and transmits the time-series data and the node-status table.

Since the sensor node 1G is in an incommunicable state, the sensor node 1B fails to transfer the time-series data and the node-status table. At S16, the sensor node 1B updates the node-status table (see FIG. 10C). At S16, the sensor node 1B sets a communicability-indicating flag of the sensor node 1G as incommunicable. Then at S17, the sensor node 1B instructs the sensor node 1E creating this time-series data to recreate time-series data. At this time, the sensor node 1B may transmit the time-series data and the node-status table to the sensor node 15 or may transmit the node-status table only to the sensor node 1E. This instruction to recreate time-series data is transmitted to the sensor node 15 via the sensor node 1H.

Figures 11A, 11B, 11C:
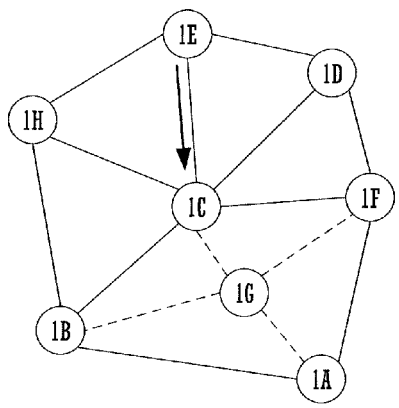
FIG. 11A to FIG. 11C describe time synchronization processing.

Upon receiving the instruction to recreate time-series data, at S19 the sensor node 1E creates time-series data and a node-status table illustrated in FIGS. 11B and 11C. The node-status table created this time registers the incommunicable state of the sensor node 1G. At S3, the sensor node 1E selects a sensor node 1C having a traversed number of times of 0 as a transmission destination of the time-series data and the node-status table. Since the sensor node 1C is adjacent to the sensor node 1E, the sensor node 1E decides the sensor node 1C as a transfer destination at S4 and transmits the time-series data and the node-status table.

Figures 12A, 12B, 12C:
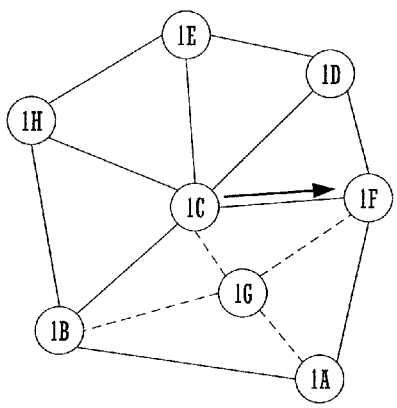
FIG. 12A to FIG. 12C describe time synchronization processing.

When receiving the time-series data and the node-status table, the sensor node 1C additionally registers time information to the time-series data at S8 (see FIG. 12B). At S11, the sensor node 1C updates the node-status table (see FIG. 12C). At S11, the sensor node 1C increments the traversed number of times corresponding to the own sensor node 1C by one. At S13, the sensor node 1C selects a sensor node 1F having a traversed number of times of 0 as a new transmission destination because the own sensor node 1C is set as the transmission destination. At this time, the sensor node 1C excludes the sensor node 1G in an incommunicable state from the options of the transmission destination. Since the sensor node 1F is adjacent to the sensor node 1C, the sensor node 1C decides the sensor node 1F as a transfer destination at S14 and transmits the time-series data and the node-status table.

Figures 13A, 13B, 13C:
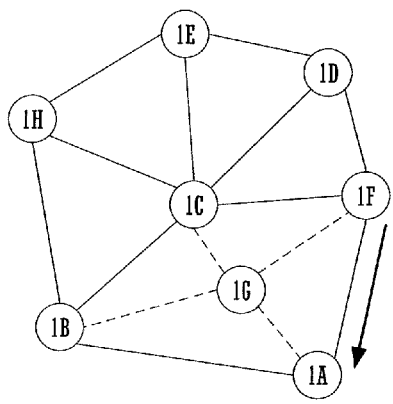
FIG. 13A to FIG. 13C describe time synchronization processing.
Figures 14A, 14B, 14C:
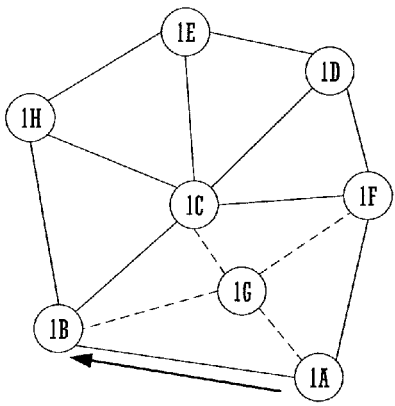
FIG. 14A to FIG. 14C describe time synchronization processing.

When receiving the time-series data and the node-status table, the sensor node 1F additionally registers time information to the time-series data at S8 (see FIG. 13B). At S11, the sensor node 1F updates the node-status table (see FIG. 13C). At S11, the sensor node 1F increments the traversed number of times corresponding to the own sensor node 1F by one. At S13, the sensor node 1F selects a sensor node 1A having a traversed number of times of 0 as a new transmission destination because the own sensor node 1F is set as the transmission destination. At this time, the sensor node 1F excludes the sensor node 1G in an incommunicable state from the options of the transmission destination. Since the sensor node 1A is adjacent to the sensor node 1F, the sensor node 1F decides the sensor node 1A as a transfer destination at S14 and transmits the time-series data and the node-status table.

The sensor node 1A receiving the time-series data and the node-status table has already completed the time-setting. At S9, the sensor node 1A additionally registers time information to the time-series data (see FIG. 14B). At S11, the sensor node 1A updates the node-status table (see FIG. 14C). At S11, the sensor node 1A increments the traversed number of times corresponding to the own sensor node 1A by one and sets a time-setting completion flag corresponding to the own sensor node.

Note here that the sensor node 1A completes the time-setting on the basis of the time-series data created by sensor nodes 1 other than the sensor node 1E.

At S13, the sensor node 1A selects the sensor node 1B having a traversed number of times of 0 as a new transmission destination because the own sensor node 1A is set as the transmission destination. At this time, the sensor node 1A excludes the sensor node 1G in an incommunicable state from the options of the transmission destination. Since the sensor node 1B is adjacent to the sensor node 1A, the sensor node 1A decides the sensor node 1B as a transfer destination at S14 and transmits the time-series data and the node-status table.

Figures 15A, 15B, 15C:
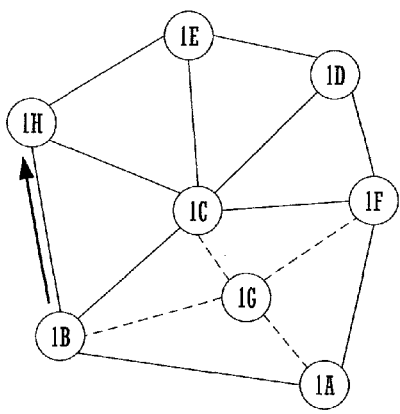
FIG. 15A to FIG. 15C describe time synchronization processing.

When receiving the time-series data and the node-status table, the sensor node 1B additionally registers time information to the time-series data at S8 (see FIG. 15B). At S11, the sensor node 1B updates the node-status table (see FIG. 15C). At S11, the sensor node 1B increments the traversed number of times corresponding to the own sensor node 1B by one. At S13, the sensor node 1B selects the sensor node 1H having a traversed number of times of 0 as a new transmission destination because the own sensor node 1B is set as the transmission destination. At this time, the sensor node 1B excludes the sensor node 1G in an incommunicable state from the options of the transmission destination. Since the sensor node 1H is adjacent to the sensor node 1B, the sensor node 1B decides the sensor node 1H as a transfer destination at S14 and transmits the time-series data and the node-status table.

Figures 16A, 16C:
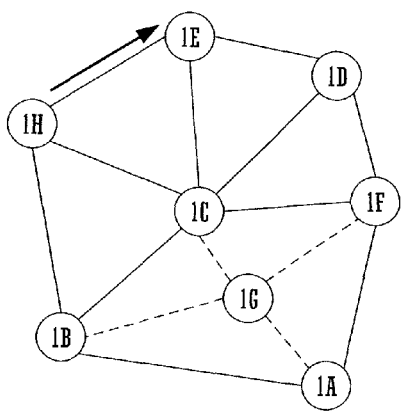

When receiving the time-series data and the node-status table, the sensor node 1H additionally registers time information to the time-series data at S8 (see FIG. 16B). At S11, the sensor node 1H updates the node-status table (see FIG. 16C). At S11, the sensor node 1H increments the traversed number of times corresponding to the own sensor node 1H by one. At S13, the sensor node 1H selects a sensor node 1D having a traversed number of times of 0 as a new transmission destination because the own sensor node 1H is set as the transmission destination. At this time, the sensor node 1H excludes the sensor node 1G in an incommunicable state from the options of the transmission destination. Since the sensor node 1D is not adjacent to the sensor node 1H, the sensor node 1H decides the sensor node 1E as a transfer destination at S14 and transmits the time-series data and the node-status table.

Figures 17A, 17B, 17C:
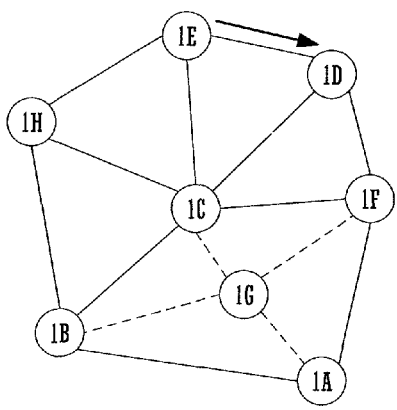
FIG. 17A to FIG. 17C describe time synchronization processing.

When receiving the time-series data and the node-status table, the sensor node 1E additionally registers time information to the time-series data at S8 (see FIG. 17B). At S11, the sensor node 1E updates the node-status table (see FIG. 17C). At S17, the sensor node 1E increments the traversed number of times corresponding to the own sensor node 1E by one. At S13, the sensor node 15 does not select a transmission destination because the own sensor node 1E is not set as the transmission destination. Since the sensor node 1D set as the transmission destination is adjacent to the sensor node 1E, the sensor node 15 decides the sensor node 1D as a transfer destination at S14 and transmits the time-series data and the node-status table.

Figures 18A, 18B, 18C:
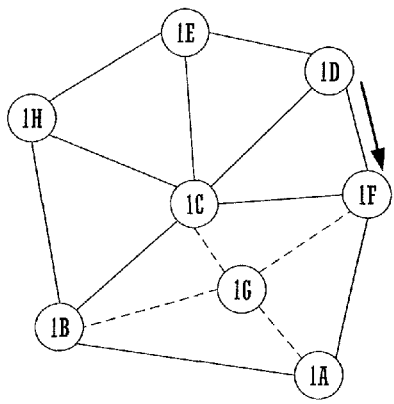
FIG. 18A to FIG. 18C describe time synchronization processing.

When receiving the time-series data and the node-status table, the sensor node 1D additionally registers time information to the time-series data at S8 (see FIG. 18B). At S11, the sensor node 1D updates the node-status table (see FIG. 18O). At S11, the sensor node 1D increments the traversed number of times corresponding to the own sensor node 1D by one. At S13, the sensor node 1D selects the sensor node 1F having a traversed number of times of 1 as a new transmission destination because the own sensor node 1D is set as the transmission destination. At this time, the sensor node 1D excludes the sensor node 1G in an incommunicable state from the options of the transmission destination. Since the sensor node 1F is adjacent to the sensor node 1D, the sensor node 1D decides the sensor node 1F as a transfer destination at S14 and transmits the time-series data and the node-status table.

Figures 19A, 19B, 19C:
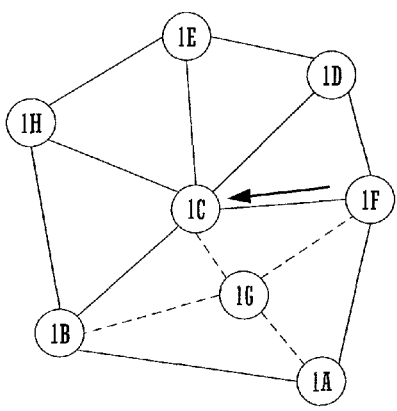
FIG. 19A to FIG. 19C describe time synchronization processing.

When receiving the time-series data and the node-status table, the sensor node 1F additionally registers time information to the time-series data at S8 (see FIG. 19B). At S11, the sensor node 1F updates the node-status table (see FIG. 19C). At S11, the sensor node 1F increments the traversed number of times corresponding to the own sensor node 1F by one. At S13, the sensor node 1F selects the sensor node 1C having a traversed number of times of 1 as a new transmission destination because the own sensor node 1F is set as the transmission destination. At this time, the sensor node 1F excludes the sensor node 1G in an incommunicable state from the options of the transmission destination. Since the sensor node 1C is adjacent to the sensor node 1F, the sensor node 1F decides the sensor node 1C as a transfer destination at S14 and transmits the time-series data and the node-status table.

Figures 20A, 20B, 20C:
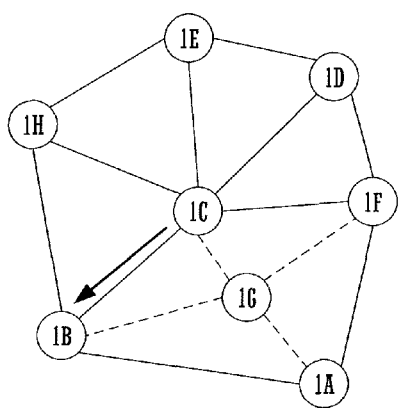
FIG. 20A to FIG. 20C describe time synchronization processing.

When receiving the time-series data and the node-status table, the sensor node 1C additionally registers time information to the time-series data at S8 (see FIG. 20B). At S11, the sensor node 1C updates the node-status table (see FIG. 20C). At S11, the sensor node 1C increments the traversed number of times corresponding to the own sensor node 1C by one. At S13, the sensor node 1C selects the sensor node 1B having a traversed number of times of 1 as a new transmission destination because the own sensor node 1C is set as the transmission destination. At this time, the sensor node 1C excludes the sensor node 1G in an incommunicable state from the options of the transmission destination. Since the sensor node 1B is adjacent to the sensor node 1C, the sensor node 1C decides the sensor node 1B as a transfer destination at S14 and transmits the time-series data and the node-status table.

Figures 21A, 21B, 21C:
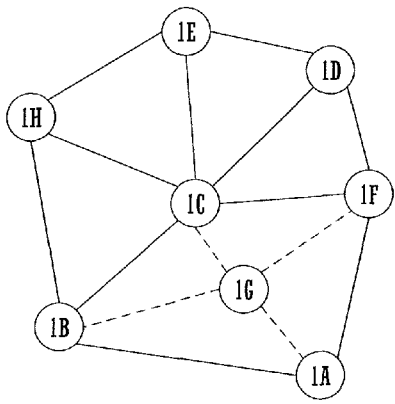
FIG. 21A to FIG. 21C describe time synchronization processing.

When receiving the time-series data and the node-status table, the sensor node 1B additionally registers time information to the time-series data at S8 (see FIG. 21B). At S10, the sensor node 1B determines that the time-series data satisfies the time-setting condition, and performs the aforementioned processing from S21 to S26. Thereby, the sensor node 1B completes the time-setting of the timer 14 in the time synchronization processing this time.

In this way, each sensor node 1 sets the time of the timer 14 of its own sensor node 1 to the average time measured by the timers 14 of the sensor nodes 1 existing on the network. Thereby, the timers 14 of the sensor nodes 1 existing on the network can be synchronized in time. Since this configuration does not require a time synchronization server, system scale can be suppressed, and the configuration can be used for an ad-hoc type network system as well.

Further, the system is configured such that the node-status table sets a communicability state of each sensor node 1 and a sensor node 1 in an incommunicable state is not set as a transmission destination or a transfer destination of time-series data and a node-status table, and therefore wasted communication can be suppressed.

In another configuration, the storage unit 13 of each sensor node 1 may be provided with a storage area to store an incommunicable sensor node 1. Then, not only when communication fails actually but also when a node-status table received is transferred, the sensor node 1 stored as incommunicable may be set in the node-status table as such. That is, if a sensor node 1 stored as incommunicable in the storage unit 13 is set as communicable in the node-status table transferred, such a sensor node 1 may be set as incommunicable. According to one or more embodiments of the present invention, there is a sensor node 1 set incommunicable in the node-status table transferred but is not stored as incommunicable in the storage unit 13, such a sensor node 1 is additionally stored in the storage unit 13. With this configuration, transferring of time-series data and a node-status table to the sensor node 1 in an incommunicable state can be securely prevented.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

EXPLANATION OF REFERENCE NUMBERS 1 (1A to 1H) Sensor node
11 Control unit
12 Sensor unit
13 Storage unit
14 Timer
15 Communication unit

The invention claimed is:

1. A network terminal, comprising:
communication section that communicates with other network terminals connected via a network;
time-series data creation section that, at timing set beforehand, creates time information including a correspondence between an identification number of the own network terminal and a current time measured by a timer of the own network terminal and creates time-series data registering the time information;
additional registration section that, when the communication section receives time-series data transmitted from another network terminal, creates time information including a correspondence between the identification number of the own network terminal and a current time measured by the timer of the own network terminal and additionally registers the time information to time-series data received this time;
transfer destination decision section that decides a network terminal as a transfer destination for each of time-series data created by the time-series data creation section and time-series data to which the additional registration section additionally registers time information;
transfer section that, every time the transfer destination decision section decides a transfer destination of the time-series data, makes the communication section transfer the time-series data;
determination section that determines nines that time-series data to which the time information is additionally registered by the additional registration section satisfies a time-setting condition when the number of network terminals registering the time information a plurality of times exceeds a threshold number of network terminals set beforehand; and
time-setting section that, when the determination section determines that the time-setting condition is satisfied, performs time-setting by correcting a time measured by the timer of the own network terminal on a basis of time information registered in the time-series data.

2. The network terminal according to claim 1, wherein
the time-setting section calculates, for each of network terminals registering the time information a plurality of times, an average transferring processing time required for transferring of the time-series data between any two network terminals on a basis of time duration between time information firstly registered by this network terminal and time information last registered by this network terminal and a number of times of transferring between the time duration, the time-setting section calculates an average origin point time using the calculated average transferring processing time for each of network terminals registering the time information a plurality of times, the average origin point time being an average of times measured by timers at specific timing, and the time-setting section further calculates a correction time to correct a time measured by the timer of the own network terminal on a basis of the calculated average transferring processing time and average origin point time.

3. The network terminal according to claim 1, wherein the determination section determines that the time-setting condition is satisfied when the number of network terminals registering the time information a plurality of times and performing transferring during duration between the time information firstly registered and the time information last registered exceeding a transferring threshold number of times set beforehand exceeds a threshold number of network terminals set beforehand in the time-series data.

4. The network terminal according to claim 1, wherein
the transfer destination decision section sets, as a transmission destination, a network terminal having a minimum number of registrations of time information in the time-series data to be transferred this time among the network terminals connected via the network, and when the network terminal set as the transmission destination is not communicable directly, the transfer destination decision section decides, as a transfer destination, another network terminal that is located on a communication path with the network terminal and is directly communicable.

5. The network terminal according to claim 4, wherein when a transmission destination set in the time-series data transmitted from another network terminal received by the communication section is other than the own network terminal, the transfer destination decision section does not set a transmission destination for the time-series data.

6. The network terminal according to claim 1, further comprising first transfer prohibition section that prohibits transferring of time-series information that the time-setting section uses for time-setting of the timer of the own network terminal to another network terminal.

7. The network terminal according to claim 1, wherein when the communication section receives the time-series data transmitted from another network terminal after completion of time-setting of the timer by the time-setting section, the additional registration section creates the time information on a basis of a time measured by the timer before the time-setting by the time-setting section and additionally registers the time information to the time-series data received this time.

8. The network terminal according to claim 1, further comprising recreation instruction section that, when the transfer section fails to transfer the time-series data, makes a notice to instruct a network terminal creating the time-series data to recreate the time-series data.

9. The network terminal according to claim 1, wherein the transfer section transfers a status table with the time-series data, the status table registering a state of communicability for each of the network terminals connected via the network.

10. The network terminal according to claim 9, wherein
the status table is a table registering a communicable state and completion/incompletion of time-setting of the timer by the time-setting section for each of the network terminals connected via the network, wherein the network terminal further comprises second transfer prohibition section that prohibits transferring of the status table and corresponding time-series information when a state of all of the network terminals registered in the status table shows either one of an incommunicable state and completion of time-setting for the timer.

11. A network system connecting a plurality of network terminals in a communicable manner via a network, each network terminal comprising:

communication section that communicates with other network terminals connected via the network;

time-series data creation section that, at timing set beforehand, creates time information including a correspondence between an identification number of the own network terminal and a current time measured by a timer of the own network terminal and creates time-series data registering the time information;

additional registration section that, when the communication section receives time-series data transmitted from another network terminal, creates time information including a correspondence between the identification number of the own network terminal and a current time measured by the timer of the own network terminal and additionally registers the time information to the time-series data received this time;

transfer destination decision section that decides a network terminal as a transfer destination for each of time-series data created by the time-series data creation section and time-series data to which the additional registration section additionally registers time information;

transfer section that, every time the transfer destination decision section decides a transfer destination of the time-series data, makes the communication section transfer the time-series data;

determination section that determines whether time-series data to which the time information is additionally registered by the additional registration section satisfies a set time-setting condition or not; and time-setting section that, when the determination section determines that the time-setting condition is satisfied, corrects a time measured by the timer of the own network terminal on a basis of time information registered in the time-series data, wherein the determination section determines that, when the number of network terminals registering the time information a plurality of times exceeds a threshold number of network terminals set beforehand in the time-series data, the time-setting condition is satisfied.

12. A time synchronization method for terminals in a network system connecting a plurality of network terminals in a communicable manner via a network, each network terminal performing the steps of:

creating, at timing set beforehand, time information including a correspondence between an identification number of the own network terminal and a current time measured by a timer of the own network terminal and creating time-series data registering the time information;

when communication section receives time-series data transmitted from another network terminal, creating time information including a correspondence between the identification number of the own network terminal and a current time measured by the timer of the own network terminal and additionally registering the time information to the time-series data received this time;

deciding a network terminal as a transfer destination for each of time-series data created by the own network terminal and time-series data to which time information is additionally registered by the own network terminal;

every time a transfer destination of the time-series data is decided, transferring the time-series data with the communication section;

when the number of network terminals registering the time information a plurality of times exceeds a threshold number of network terminals set beforehand in the time-series data to which the own network terminal additionally registers the time information, determining that a time-setting condition is satisfied; and when it is determined that the time-setting condition is satisfied, performing time-setting by correcting a time measured by the timer of the own network terminal on a basis of time information registered in the time-series data.

13. A non-transitory computer-readable recording medium storing a time synchronization program making a network terminal provided with communication section that communicates with other network terminals connected via a network function as:

time-series data creation section that, at timing set beforehand, creates time information including a correspondence between an identification number of the own network terminal and a current time measured by a timer of the own network terminal and creates time-series data registering the time information;

additional registration section that, when the communication section receives time-series data transmitted from another network terminal, creates time information including a correspondence between the identification number of the own network terminal and a current time measured by the timer of the own network terminal and additionally registers the time information to the time-series data received this time;

transfer destination decision section that decides a network terminal as a transfer destination for each of time-series data created by the time-series data creation section and time-series data to which time information is additionally registered by the additional registration section;

transfer section that, every time the transfer destination decision section decides a transfer destination of the time-series data, makes the communication section transfer the time-series data;

determination section that determines that time-series data to which the time information is additionally registered by the additional registration section satisfies a time-setting condition when the number of network terminals registering the time information a plurality of times exceeds a threshold number of network terminals set beforehand; and time-setting section that, when the determination section determines that the time-setting condition is satisfied, performs time-setting by correcting a time measured by the timer of the own network terminal on a basis of time information registered in the time-series data.

* * * * *

UNITED STATES PATENT AND TRADEMARK OFFICE
CERTIFICATE OF CORRECTION

PATENT NO. : 8,867,434 B2
APPLICATION NO. : 13/263393
DATED : October 21, 2014
INVENTOR(S) : Takeshi Naito et al.

It is certified that error appears in the above-identified patent and that said Letters Patent is hereby corrected as shown below:

In the Claims:

At column 14, claim number 1, line number 53, "determines nines that time-series" should read --determines that time-series--.

Signed and Sealed this
Second Day of June, 2015

Michelle K. Lee
*Director of the United States Patent and Trademark Office*